United States Patent
King et al.

(10) Patent No.: US 6,918,707 B2
(45) Date of Patent: Jul. 19, 2005

(54) KEYBOARD PRINTER PRINT MEDIA TRANSPORT ASSEMBLY

(75) Inventors: Tobin Allen King, Balmain (AU); Kia Silverbrook, Balmain (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

(21) Appl. No.: 10/974,765

(22) Filed: Oct. 28, 2004

(65) Prior Publication Data

US 2005/0058491 A1 Mar. 17, 2005

Related U.S. Application Data

(63) Continuation of application No. 10/309,026, filed on Dec. 4, 2002, now Pat. No. 6,830,395, which is a continuation of application No. 09/966,293, filed on Sep. 28, 2001, now Pat. No. 6,641,315, which is a continuation-in-part of application No. 09/112,767, filed on Jul. 10, 1998, now Pat. No. 6,416,167.

(30) Foreign Application Priority Data

| Jul. 15, 1997 | (AU) | PO7991 |
| Mar. 25, 1998 | (AU) | PQ2592 |

(51) Int. Cl.$^7$ ................................................ B41J 5/08
(52) U.S. Cl. ........................... 400/472; 400/88; 400/489
(58) Field of Search .......................... 400/88, 472, 489

(56) References Cited

U.S. PATENT DOCUMENTS

| 4,423,401 A | 12/1983 | Mueller |
| 4,553,393 A | 11/1985 | Ruoff |
| 4,623,965 A | 11/1986 | Wing |
| 4,672,398 A | 6/1987 | Kuwabara et al. |
| 4,737,802 A | 4/1988 | Mielke |
| 4,864,824 A | 9/1989 | Gabriel et al. |
| 5,029,805 A | 7/1991 | Albarda et al. |
| 5,115,374 A | 5/1992 | Hongoh |
| 5,188,464 A | 2/1993 | Aaron |
| 5,189,473 A * | 2/1993 | Negoro et al. ................ 399/93 |
| 5,258,774 A | 11/1993 | Rogers |
| 5,345,403 A * | 9/1994 | Ogawa et al. ............. 361/681 |
| 5,443,320 A | 8/1995 | Agata et al. |
| 5,659,345 A | 8/1997 | Altendorf |
| 5,845,144 A | 12/1998 | Tateyama et al. |

(Continued)

FOREIGN PATENT DOCUMENTS

| DE | 1 648 322 | 3/1971 |
| DE | 29 05 063 | 8/1980 |
| DE | 32 45 283 | 8/1984 |
| DE | 34 30 155 | 2/1986 |

(Continued)

OTHER PUBLICATIONS

Noworolski, J. Mark et al, "Process for in–plane and out–of–plane single–crystal–silicon thermal microactuators". Sensors and Actuators, A, CH, Elsevier Sequoia S.A., Lausanne, vol. 55, No. 1, Jul. 15, 1996, pp 65–69, XP004077979 ISSN: 0924–4247.

(Continued)

*Primary Examiner*—Charles H. Nolan, Jr.

(57) ABSTRACT

A printer includes a housing having an upper side bearing a computer keyboard comprised of a plurality of keypads. The keypads are arranged to interact with a keyboard circuit board located within the housing. A print media entry slot is formed through a first side of the housing and a print media ejection slot through a second opposite side. A print media transport assembly is located between the keyboard circuit board and an underside of the housing. The transport assembly operates to draw print media through the entry slot into the printer during use. Preferably the print media transport assembly includes a belt disposed about at least two rollers and arranged to transport print media from the entry slot to a printhead assembly. A planar member in the form of a sprung metal plate is biased to maintain planarity of the belt.

4 Claims, 3 Drawing Sheets

U.S. PATENT DOCUMENTS

| | | |
|---|---|---|
| 6,155,669 A | 12/2000 | Donahue et al. |
| 6,158,906 A | 12/2000 | Simon et al. |
| 6,312,099 B1 | 11/2001 | Hawkins |
| 6,474,882 B1 | 11/2002 | Vaghi |
| 6,555,201 B1 | 4/2003 | Dhuler et al. |

FOREIGN PATENT DOCUMENTS

| | | |
|---|---|---|
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 508 232 | 9/1992 |
| EP | 0 510 648 | 10/1992 |
| EP | 0 627 314 | 12/1994 |
| EP | 0706893 B1 | 4/1996 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 078 | 12/1974 |
| GB | 792 145 | 3/1958 |
| GB | 1 428 239 | 3/1976 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 308254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 03 653348 | 3/1991 |
| JP | 03 112662 | 5/1991 |
| JP | 03 180350 | 8/1991 |
| JP | 04 118241 | 4/1992 |
| JP | 04 126256 | 4/1992 |
| JP | 04 141429 | 5/1992 |
| JP | 4-353458 | 12/1992 |
| JP | 04 368851 | 12/1992 |
| JP | 05108278 | 4/1993 |
| JP | 05 28765 | 10/1993 |
| JP | 05 318724 | 12/1993 |
| JP | 6-91865 | 4/1994 |
| JP | 6-91866 | 4/1994 |
| JP | 2-265752 | 1/1995 |
| JP | 07 314665 | 12/1995 |
| JP | 11212703 A * | 8/1999 | ............ G06F/3/02 |
| WO | WO 94 18010 | 8/1994 |
| WO | WO 95 10810 | 4/1995 |
| WO | WO 97 12689 | 4/1997 |

OTHER PUBLICATIONS

Ataka, Manabu et al, "Fabrication and Operation of Polymide Bimorph Actuators for Ciliary Motion System", Journal of Microelectromechanical Systems, US, IEEE Inc. New York, vol. 2, No. 4, Dec. 1, 1993, pp 146–150, XP000443412, ISSN: 1057–7157.

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp 142–147, XP000528408, ISBN: 0–7803–1834–X.

"ABLEDATA Database of Assistive Technology", Feb. 1999 p2–3 shows Postron Express keyboard/printer.

"Enhanced Communications" website showing Postron Express keyboard/printer. Copyright 1997–2000 http://web.archive.org/web/20020819212351re_/http://www.enhancedcom.net/positron express.asp.

"TDD Products for PSAPS" (Larson) Mar./Apr. 1997 from 9–11 Magazine Note: Establishes that "Positron Express-"keyboard integrated with printer was known in 1997.

* cited by examiner

US 6,918,707 B2

KEYBOARD PRINTER PRINT MEDIA TRANSPORT ASSEMBLY

CROSS REFERENCE TO RELATED APPLICATION

The present application is a continuation of U.S. application Ser. No. 10/309,026 filed on Dec. 4,2002 now U.S. Pat. No. 6,830,395 which is a continuation of U.S. application Ser. No. 09/966,293 filed on Sep. 28, 2001 , now issued as U.S. Pat. No. 6,641,315, which is a continuation in part of U.S. application Ser. No. 09/112,767 filed on Jul. 10, 1998 now issued as U.S. Pat. No. 6,416,167, the entire contents of which are herein incorporated by reference.

FIELD OF INVENTION

This invention relates to a user interface with integrated printing. More particularly, the invention relates to a computer keyboard including a print media transport assembly for an integrated printer.

BACKGROUND TO THE INVENTION

Printers for use with computers can be relatively expensive devices. Accordingly, in a work environment, it is common for a plurality of work stations to be serviced by a single printer station with the computers of those work stations communicating with the printer.

This necessitates people at the work station having to get up and collect their documents from the printer which can be time wasting. Often, all that is required is a single sheet of paper, for example, where a letter is to be generated or where an image is to be viewed and a hard copy of the image is required.

Desktop inkjet printers are available at low cost, but typically take up substantial desk space. Incorporation of the printing function in a desktop computer keyboard frees up this desk space.

While it is technically possible to incorporate a scanning ink jet printer into a keyboard, this has several disadvantages, including excess bulk, and side-to-side vibration as the printhead scans.

Recently, the present inventor has invented ink jet printer technologies suitable for incorporation in a desktop keyboard, such as:

| | | | | |
|---|---|---|---|---|
| 6,227,652 | 6,213,588 | 6,213,589 | 6,231,163 | 6,247,795 |
| 09/113,099 | 6,244,691 | 6,257,704 | 09/112,778 | 6,220,694 |
| 6,257,705 | 6,247,794 | 6,234,610 | 6,247,793 | 6,264,306 |
| 6,241,342 | 6,247,792 | 6,264,307 | 6,254,220 | 6,234,611 |
| 09/112,808 | 09/112,809 | 6,239,821 | 09/113,083 | 6,247,796 |
| 09/113,122 | 09/112,793 | 09/112,794 | 09/113,128 | 09/113,127 |
| 6,227,653 | 6,234,609 | 6,238,040 | 6,188,415 | 6,227,654 |
| 6,209,989 | 6,247,791 | 09/112,764 | 6,217,153 | 09/112,767 |
| 6,243,113 | 09/112,807 | 6,247,790 | 6,260,953 | 6,267,469 |
| 09/425,419 | 09/425,418 | 09/425,194 | 09/425,193 | 09/422,892 |
| 09/422,806 | 09/425,420 | 09/422,893 | 09/693,703 | 09/693,706 |
| 09/693,313 | 09/693,279 | 09/693,727 | 09/693,708 | 09/575,141 |

These ink jet technologies are suitable for the construction of miniature, low cost pagewidth printers, which can readily fit within a keyboard form factor.

SUMMARY OF THE INVENTION

According to a first aspect of the present invention there is provided a printer including
 a housing having an upper side bearing a plurality of keypads arranged to interact with a keyboard circuit board located within the housing;
 a print media entry slot formed through a first side of the housing and a print media ejection slot formed through a second side of the housing opposite the first side; and
 a print media transport assembly located between the keyboard circuit board and a bottom side of the housing, said assembly arranged to draw print media through the entry slot.

Preferably the print media transport assembly includes a belt disposed about at least two rollers and arranged to transport print media from the entry slot to a printhead assembly.

The printer may further include a planar member biased against the belt to maintain planarity of the belt.

In one embodiment the planar member comprises a sprung metal plate.

A spiked wheel may be coupled to one of the at least two rollers and arranged to transport the print media from the printhead assembly through the media ejection slot.

More specifically, in one embodiment the present invention provides a printer including:
 a housing having an upper side bearing a keyboard and an opposing underside for placement upon a surface;
 the housing defining a print media entry slot formed into a side of the housing facing towards an operator in use and a print media ejection slot formed into a side of the housing facing away from the operator in use;
 the key board being arranged to interact with a keyboard circuit board located within the housing; and
 a belt and roller assembly located between the keyboard circuit board and the underside of the housing, said assembly arranged to draw print media through the entry slot towards a printhead assembly; and
 a driven spiked wheel located between the printhead assembly and the ejection slot and arranged to pull the print media across the printhead assembly and eject it through the ejection slot.

BRIEF DESCRIPTION OF THE DRAWINGS

The invention is now described by way of example with reference to the accompanying diagrammatic drawings in which.

DETAILED DESCRIPTION OF THE DRAWINGS

Figure 2:
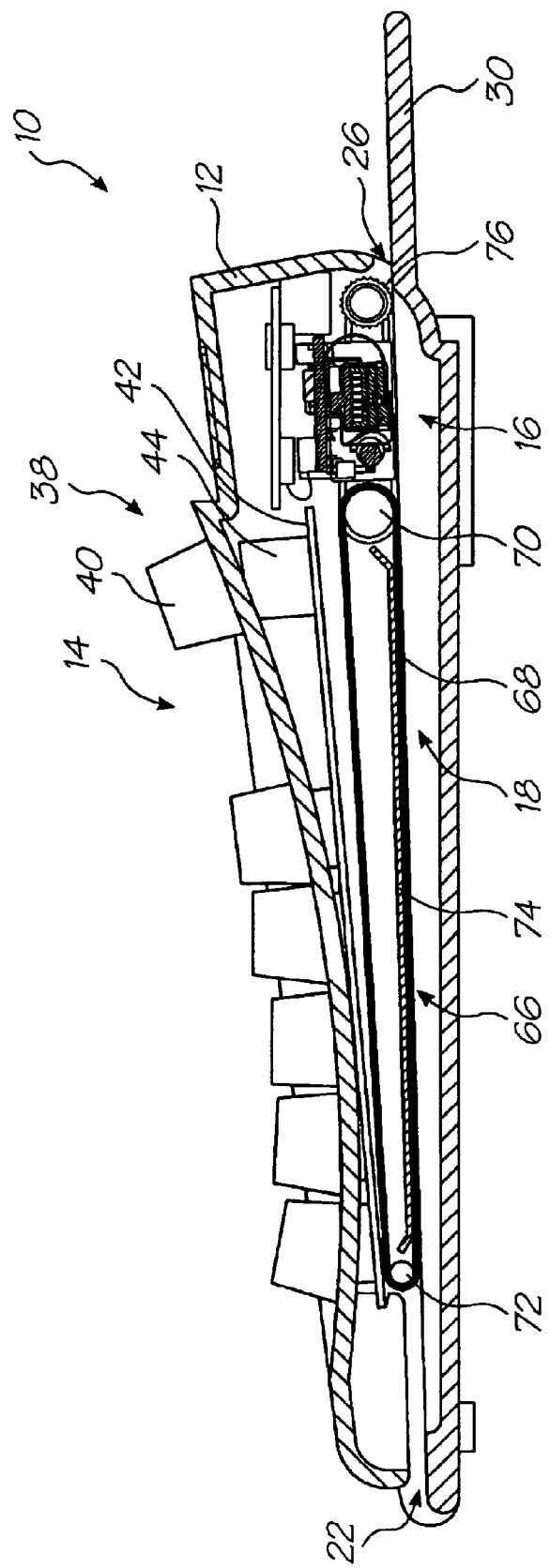
FIG. 2 shows a sectional side view of the keyboard.
Figure 3:
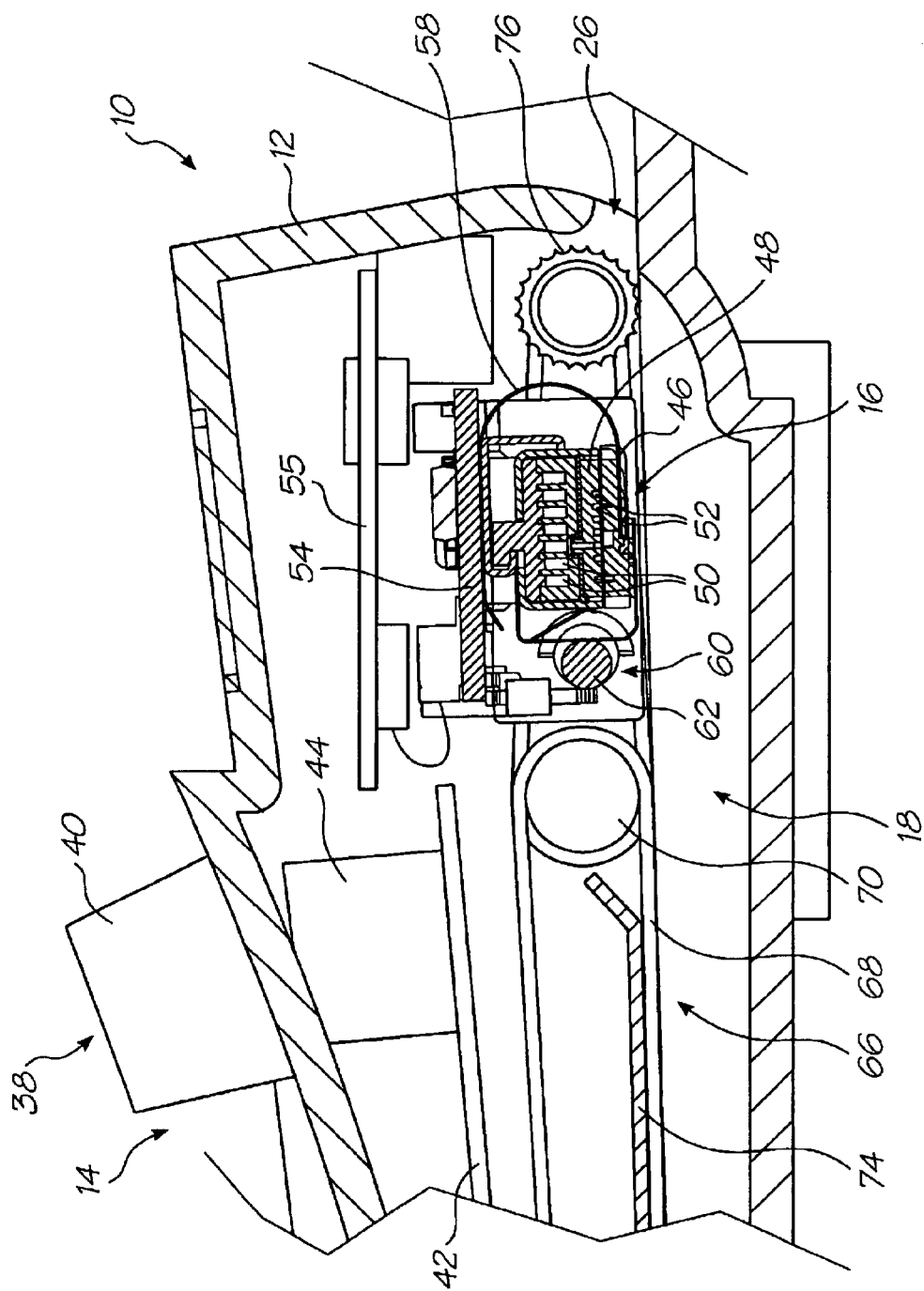
FIG. 3 shows, on an enlarged scale, a sectional side view of part of the keyboard.

In the drawings, reference numeral 10 generally designates a keyboard in accordance with the invention. The keyboard 10 is intended particularly for use with a computer. The keyboard 10 comprises a housing 12 on which a keypad 14 is arranged. A printer 16 (FIGS. 2 and 3) is contained in a chamber 18 defined in the housing 12 of the keyboard 10.

The housing 12 is dimensioned similarly to a conventional computer keyboard and is substantially rectangular when viewed in plan having a pair of opposed, longer sides and a pair of opposed, shorter sides. An input slot 22 is defined in one of the longer sides of the housing 12 for feeding print media in the form of a sheet of paper 24 to the printer 16. Preferably, the input slot 22 is defined in that side of the housing 12 which, in use, is closer to a user of the keyboard 10.

An ejection slot 26 is defined in an opposed, longer side of the housing through which the sheet of print media, incorporating an image 28, is ejected after completion of printing. An exit tray 30 extends outwardly from the ejection slot 26 on to which the sheet of paper 24 is fed after printing.

The keypad 14 includes an array if keys 38 arranged in a QWERTY keypad 32, a numerals keypad 34 and a plurality of control keys 36. Each key 38 of the keypad 14 includes a key cap 40 which communicates with a keyboard circuit board 42 (FIGS. 2 and 3) through an opening in a top surface of the housing 12. The key caps 40 engage key switches 44 mounted on the circuit board 42.

The printer 16 comprises a page width ink jet printhead 46 mounted in a support 48. The printhead 46 is a multi-color printhead for printing photo quality images 28. Accordingly, the support 48 includes a plurality of galleries 50, each of which contains a different color ink to be fed via passages 52 to the printhead 46.

Figure 1:
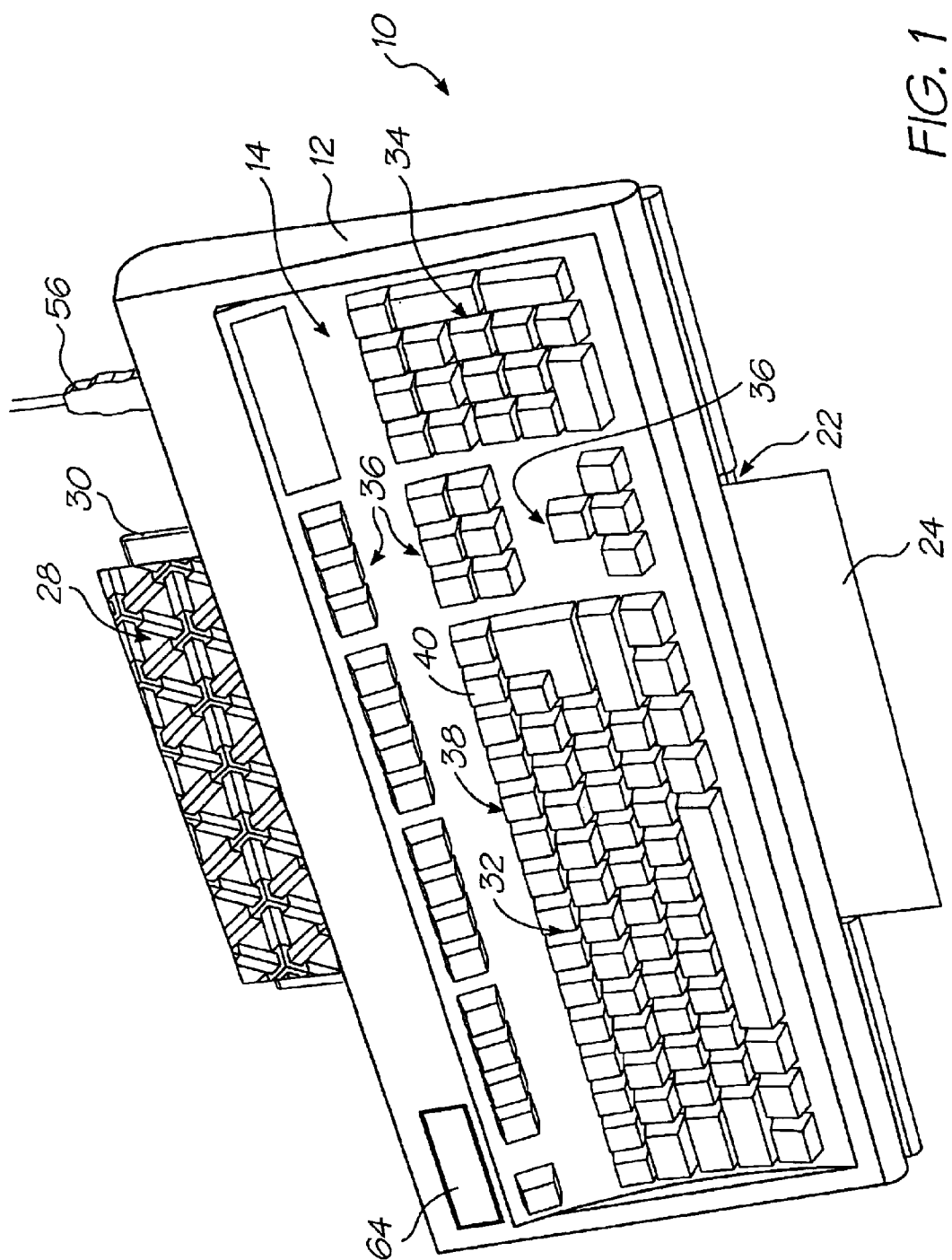
FIG. 1 shows a three dimensional view of a keyboard, in accordance with the invention.

The printer 16 includes a controller printed circuit board (PCB) 55. The PCB 55 receives printing commands from the computer (not shown) via a USB connector 56 (FIG. 1). A printhead PCB 54 communicates with the printhead 46 via a TAB automated bond film 58 or any other suitable, flexible film. The controller PCB 55 connects to the printhead PCB 54 via a flexible film.

A retaining device, in the form of a locking member 60, releasably locks the printer 16 in position in the chamber 18 of the housing 12. The locking device 60 includes a cam-like locking member 62.

Further, the printer 16 includes an ink supply cartridge (not shown) for feeding ink to the galleries 50 of the printhead support 48. The ink supply cartridge is accessed through an opening, closed off by a lid 64 (FIG. 1), in a top surface of the housing 12 to replace the cartridge when its supply of ink has been depleted.

The keyboard 10 includes a feed mechanism 66 for feeding the sheet of paper 24 to the printer 16. The feed mechanism 66 comprises an endless belt 68 which is rotated by a drive roller 70 and extends about an opposed, idler roller 72. A planar member in the form of a sprung metal plate 74 bears against the belt 68 to maintain the planarity of the belt 68 and, accordingly, the sheet of paper 24.

An engaging means, in the form of at least one spiked wheel 76, is arranged intermediate the printer 16 and the ejection slot 26. The, or each, spiked wheel 76 engages the sheet of paper 24, after printing of the image 28, and feeds the sheet of paper 24 through the ejection slot 26 to be accessed by the user.

In use, when an image 28 is to be printed, the user inserts a sheet of paper into the keyboard through the input slot 22 where it is fed to the printer 16 by the feed arrangement 66. By means of an appropriate command via the computer, the information or image to be printed is fed to the printer 16 via the USB connector 56 and the controller PCB 55. The printer 16 is controlled by the PCB 55 to print the image 28 on the sheet of paper 24 and to cause ejection of the sheet of paper 24 together with its printed image 28 thereon through the ejection slot 26.

It is an advantage of the invention that a computer peripheral is provided which enables a person rapidly to obtain copies of images while seated before the person's computer. In this regard, it is to be noted that the printer 16 is a high speed printer which can print at rates of up to 30 pages per minute. Hence, the need for using a communal work station is obviated. In addition, the incorporation of the printer within the keyboard 10 considerably reduces the space required for a computer together with its peripherals and, in so doing, providing more space to a user. It will be appreciated that this can be of major benefit where the work station is a confined working space.

What is claimed is:

1. A printer including:

a housing having an upper side bearing a keyboard and an opposing underside for placement upon a surface;

the housing defining a print media entry slot formed into a side of the housing facing towards an operator in use and a print media ejection slot formed into a side of the housing facing away from the operator in use;

the key board being arranged to interact with a keyboard circuit board located within the housing; and a belt and roller assembly located between the keyboard circuit board and the underside of the housing, said assembly arranged to draw print media through the entry slot towards a printhead assembly; and a driven spiked wheel located between the printhead assembly and the ejection slot and arranged to pull the print media across the printhead assembly and eject it through the ejection slot.

2. A printer according to claim 1, wherein the belt is disposed about at least two rollers and arranged to transport print media from the entry slot to a printhead assembly.

3. A printer according to claim 2, further including a planar member biased against the belt to maintain planarity of the belt.

4. A printer according to claim 3, wherein the planar member comprises a sprung metal plate.

* * * * *